United States Patent
Jung (10) Patent No.: US 11,535,221 B2
(45) Date of Patent: Dec. 27, 2022

(54) BRAKE DEVICE FOR VEHICLE

(71) Applicant: Hyundai Mobis Co., Ltd., Seoul (KR)

(72) Inventor: Jae Woo Jung, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 215 days.

(21) Appl. No.: 16/899,945

(22) Filed: Jun. 12, 2020

(65) Prior Publication Data
US 2020/0391713 A1 Dec. 17, 2020

(30) Foreign Application Priority Data

Jun. 14, 2019 (KR) .......................... 10-2019-0070669

(51) Int. Cl.
*B60T 13/74* (2006.01)
*B60T 13/14* (2006.01)
*B60T 13/68* (2006.01)
*B60T 17/22* (2006.01)
*B60T 17/06* (2006.01)

(52) U.S. Cl.
CPC .......... *B60T 13/142* (2013.01); *B60T 13/686* (2013.01); *B60T 13/745* (2013.01); *B60T 17/06* (2013.01); *B60T 17/22* (2013.01); *B60T 2270/84* (2013.01)

(58) Field of Classification Search
CPC .... B60T 13/74; B60T 13/745; B60T 2270/84; B62D 5/0481; B62D 5/0484; H02P 29/024; H02P 29/028
See application file for complete search history.

(56) References Cited

U.S. PATENT DOCUMENTS

| | | | | |
|---|---|---|---|---|
| 7,859,212 B2* | 12/2010 | Pan | ....................... | H02M 7/493 318/400.2 |
| 2007/0194621 A1* | 8/2007 | Ishizuka | ............... | B60T 8/4063 303/10 |
| 2008/0208426 A1* | 8/2008 | Iwasaki | ................. | B60T 17/221 701/70 |
| 2008/0224533 A1* | 9/2008 | Nakada | ................. | B60T 8/4059 303/10 |
| 2009/0189440 A1* | 7/2009 | Abe | ........................ | B60T 8/321 303/114.1 |

(Continued)

FOREIGN PATENT DOCUMENTS

KR 10-2013-0102923 9/2013
WO WO-2020195263 A1 * 10/2020

*Primary Examiner* — Bradley T King
(74) *Attorney, Agent, or Firm* — H.C. Park & Associates, PLC (57) ABSTRACT

A brake device for a vehicle including: a master cylinder unit configured to generate hydraulic pressure by pressing of a pedal; a reservoir connected to the master cylinder unit and configured to store oil; a driving unit operated by movement of the pedal and configured to receive electric energy through a plurality of batteries to supply rotation power; a hydraulic generation unit configured to rotate by receiving the rotation power of the driving unit and generate hydraulic pressure by rotation of a plurality of rotors; wheel cylinder units configured to receive the hydraulic pressure generated by the hydraulic generation unit and constrain rotation of wheels; and a control unit configured to detect whether the driving unit normally operates and control an operation of the driving unit to supply the hydraulic generation unit with the rotation power in an event of abnormal operation of the driving unit.

5 Claims, 10 Drawing Sheets

(56) References Cited

U.S. PATENT DOCUMENTS

| | | | | |
|---|---|---|---|---|
| 2011/0073419 A1* | 3/2011 | Matsuzaki | ............ | B60T 7/122 |
| | | | | 188/106 P |
| 2011/0156627 A1* | 6/2011 | Nakamura | .......... | B62D 5/0487 |
| | | | | 318/400.22 |
| 2013/0299271 A1* | 11/2013 | Endo | ..................... | B62D 5/046 |
| | | | | 180/446 |
| 2015/0217742 A1* | 8/2015 | Koyama | ............. | B60T 13/686 |
| | | | | 303/6.01 |
| 2016/0043670 A1* | 2/2016 | Nakamura | .......... | B62D 5/0487 |
| | | | | 318/400.17 |
| 2019/0199086 A1* | 6/2019 | Li | ........................ | H02P 7/2913 |
| 2019/0363664 A1* | 11/2019 | Nakamura | .......... | B62D 5/0463 |
| 2020/0182706 A1* | 6/2020 | Maruyama | ......... | H02M 7/5395 |
| 2020/0282840 A1* | 9/2020 | Yamamoto | ............. | F16D 61/00 |
| 2020/0317258 A1* | 10/2020 | Nakamura | .......... | B62D 5/0493 |
| 2021/0188233 A1* | 6/2021 | Yuyama | ................... | B60T 8/92 |
| 2021/0237706 A1* | 8/2021 | Kim | ...................... | B60T 17/22 |

\* cited by examiner

BRAKE DEVICE FOR VEHICLE

CROSS-REFERENCE TO RELATED APPLICATION

This application claims priority from and the benefit of Korean Patent Application No. 10-2019-0070669, filed on Jun. 14, 2019, which is hereby incorporated by reference for all purposes as if set forth herein.

BACKGROUND

Field

Exemplary embodiments of the present disclosure relate to a brake device for a vehicle, and more particularly, to a brake device for a vehicle that can simplify a system by using a gear pump as an electric booster and smoothly perform emergency braking when an error occurs in the electric booster.

Discussion of the Background

In general, a brake device is a device that decelerates or stops a vehicle.

Typically, when a driver steps on a pedal, the brake device is boosted by an electric booster and hydraulic pressure formed by a master cylinder is supplied to wheel cylinders that provide a braking force to respective wheels. Alternatively, when a motor pump is driven as pressure applied to the pedal is detected, the hydraulic pressure is amplified and reaches the wheel cylinders to brake the vehicle.

An electronic stability control (ESC) system of the vehicle repeatedly performs an operation of increasing, decreasing, and maintaining the pressure of the wheel cylinder according to the rotational state of each wheel in order to prevent locking of the wheels.

That is, in order to increase the pressure of the wheel cylinder, the hydraulic pressure is supplied to the wheel cylinder through an inlet valve, and in order to decrease the pressure of the wheel cylinder, the flow rate from the wheel cylinder is allowed to flow to an accumulator through an outlet valve so that the pressure of the wheel cylinder drops. Alternatively, the pressure of the wheel cylinder may be kept constant by an operation of closing both the inlet valve and the outlet valve.

Meanwhile, the ESC system is provided with an electric booster and a master cylinder that form braking pressure by a brake pedal operating force of a driver, and is provided with a motor pump that allows braking pressure to be formed regardless of the pedal operation of the driver, a traction control valve (TCV) and a high pressure switch valve (HSV) that allow braking states of wheels to be adjusted using the braking pressure generated by the motor pump, independently of a braking operation of the driver, and the like.

In the related art, since a brake device installed in a vehicle needs to use a piston pump as the electric booster, a certain stroke needs to be ensured, resulting in a problem that the length of a system becomes long and a problem that concentric management of a piston and a motor shaft is difficult to perform. Furthermore, there is no redundancy structure for emergency braking when an error occurs in the electric booster, resulting in a problem that stability is reduced. In this regard, it is necessary to solve such problems.

The background art of the present disclosure is disclosed in Korean Patent Application Laid-Open No. 10-2013-0102923 (published on Sep. 23, 2013 and entitled "Electronic Hydraulic Brake Device"). The above information disclosed in this Background section is only for enhancement of understanding of the background of the invention and, therefore, it may contain information that does not constitute prior art.

SUMMARY

Exemplary embodiments of the present invention are directed to providing a brake device for a vehicle that can simplify a system by using a gear pump as an electric booster and smoothly perform emergency braking when an error occurs in the electric booster.

In an embodiment, a brake device for a vehicle includes: a master cylinder unit configured to generate hydraulic pressure by pressing of a pedal; a reservoir connected to the master cylinder unit and configured to store oil; a driving unit operated by movement of the pedal and configured to receive electric energy through a plurality of batteries to supply rotation power; a hydraulic generation unit configured to rotate by receiving the rotation power of the driving unit and generate hydraulic pressure by rotation of a plurality of rotors; wheel cylinder units configured to receive the hydraulic pressure generated by the hydraulic generation unit and constrain rotation of wheels; and a control unit configured to detect whether the driving unit normally operates and control an operation of the driving unit to supply the hydraulic generation unit with the rotation power in an event of abnormal operation of the driving unit.

Furthermore, the driving unit includes: a 3-phase motor configured to generate the rotation power by supply of electricity; a first battery configured to supply power to the 3-phase motor; a first inverter configured to convert the power of the first battery into 3-phase power and supply the 3-phase power to the 3-phase motor; a second battery configured to supply power to the 3-phase motor together with the first battery; and a second inverter configured to convert the power of the second battery into 3-phase power and supply the 3-phase power to the 3-phase motor.

Furthermore, the first inverter includes: a first relay configured to control the supply of the power of the first battery; and a plurality of first switches configured to convert the power passing through the first relay into 3-phase power.

Furthermore, the second inverter includes: a second relay configured to control the supply of the power of the second battery; and a plurality of second switches configured to convert the power passing through the second relay into 3-phase power.

Furthermore, when a failure of the second inverter is detected, the control unit outputs a switching open control signal to the second relay, controls operations of the first relay and the first switches such that output of the first inverter is doubled, and controls and reduces an operation time of the first switches to ¼.

Furthermore, when a failure of the second relay is detected, the control unit outputs a switching open control signal to the second switches, controls operations of the first relay and the first switches such that output of the first inverter is doubled, and controls and reduces the operation time of the first switches to ¼.

Furthermore, when a failure of the first inverter is detected, the control unit outputs a switching open control signal to the first relay, controls operations of the second relay and the second switches such that output of the second inverter is doubled, and controls and reduces an operation time of the second switches to ¼.

Furthermore, when a failure of the first relay is detected, the control unit outputs a switching open control signal to the first switches, controls operations of the second relay and the second switches such that output of the second inverter is doubled, and controls and reduces the operation time of the second switches to ¼.

Furthermore, the present disclosure further includes: a fluid path part connected to the master cylinder unit, the reservoir, the hydraulic generation unit, and the wheel cylinder units and configured to transmit oil; and a valve part installed in the fluid path part and configured to control a flow of the oil.

Furthermore, the fluid path part includes: a first fluid path configured to transmit hydraulic pressure for general braking generated by the hydraulic generation unit to the wheel cylinder units installed on front wheels and rear wheels; a second fluid path configured to transmit hydraulic pressure for decompression, which is discharged from the hydraulic generation unit, to the reservoir; and a transmission fluid path configured to connect the master cylinder unit and the first fluid path and supply the first fluid path with hydraulic pressure for emergency braking generated by the master cylinder unit.

Furthermore, the first fluid path includes: a front fluid path configured to supply the hydraulic pressure to the wheel cylinder units installed on the front wheels; a rear fluid path configured to supply the hydraulic pressure to the wheel cylinder units installed on the rear wheels; a connection fluid path configured to connect the front fluid path and the rear fluid path; and a bridge fluid path configured to connect the connection fluid path and the hydraulic generation unit.

Furthermore, the valve part includes: a connection control valve installed in the connection fluid path and configured to control a flow of the hydraulic pressure.

In the brake device for a vehicle according to the embodiments, since the hydraulic generation unit is used as an electric booster, it is possible to simplify the system as compared with a cylinder-type electric booster, so that it is possible to increase the degree of freedom of design Furthermore, when an error occurs in the driving unit, an emergency operation is easily performed under the control of the control unit, so that it is possible to improve the operation reliability of the device. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, a brake device for a vehicle in accordance with an embodiment of the present disclosure will be described below with reference to the accompanying drawings. In this process, the thickness of lines or the size of elements illustrated in the drawings may be exaggerated for the purpose of clarity and convenience of explanation.

Furthermore, terms to be described later are terms defined in consideration of functions in the present disclosure and may be changed according to the intention of a user or an operator, or practice. Accordingly, such terms should be defined based on the disclosure over the present specification.

Figure 1:
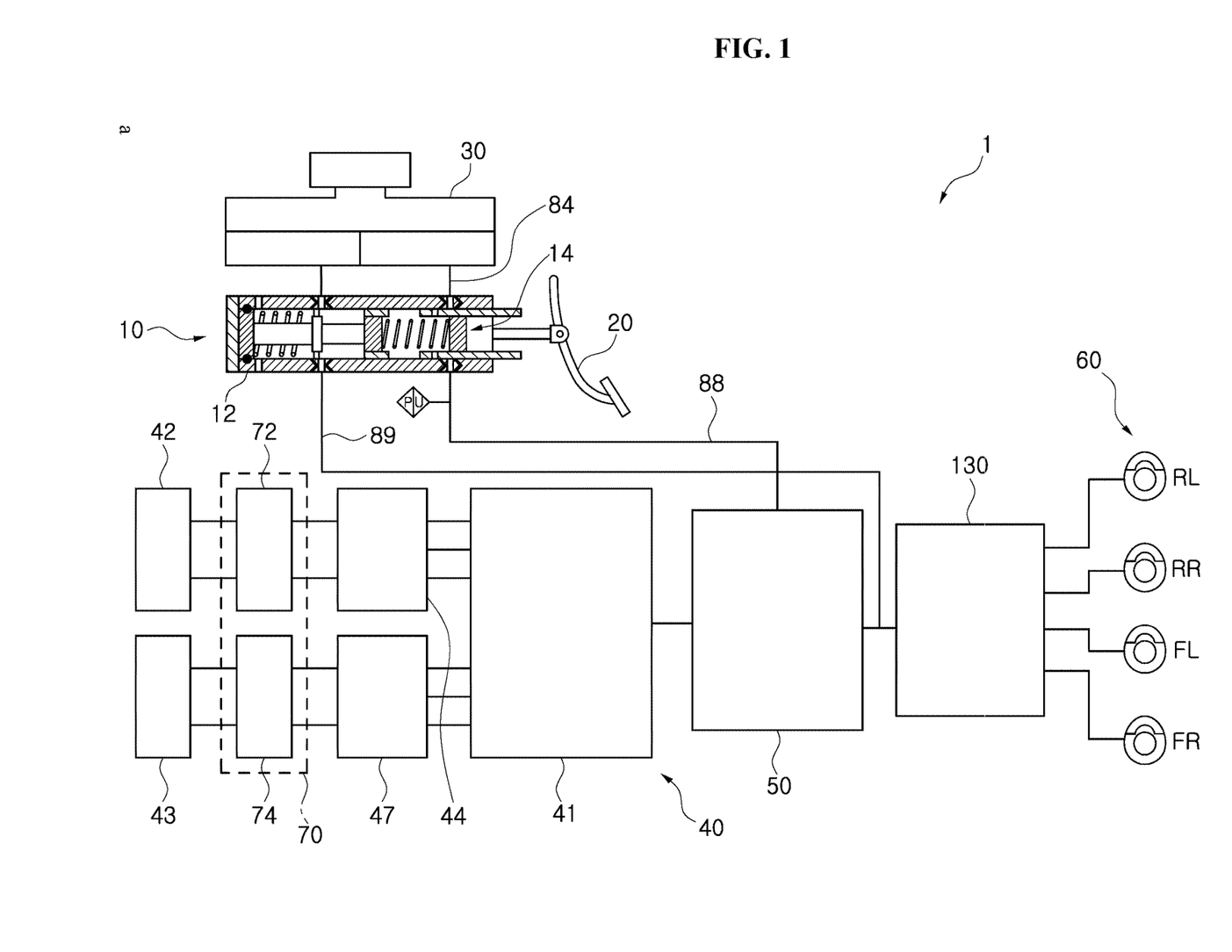
FIG. 1 is a diagram schematically illustrating a connection state of main configurations of a brake device for a vehicle in accordance with an embodiment of the present disclosure.
Figure 2:
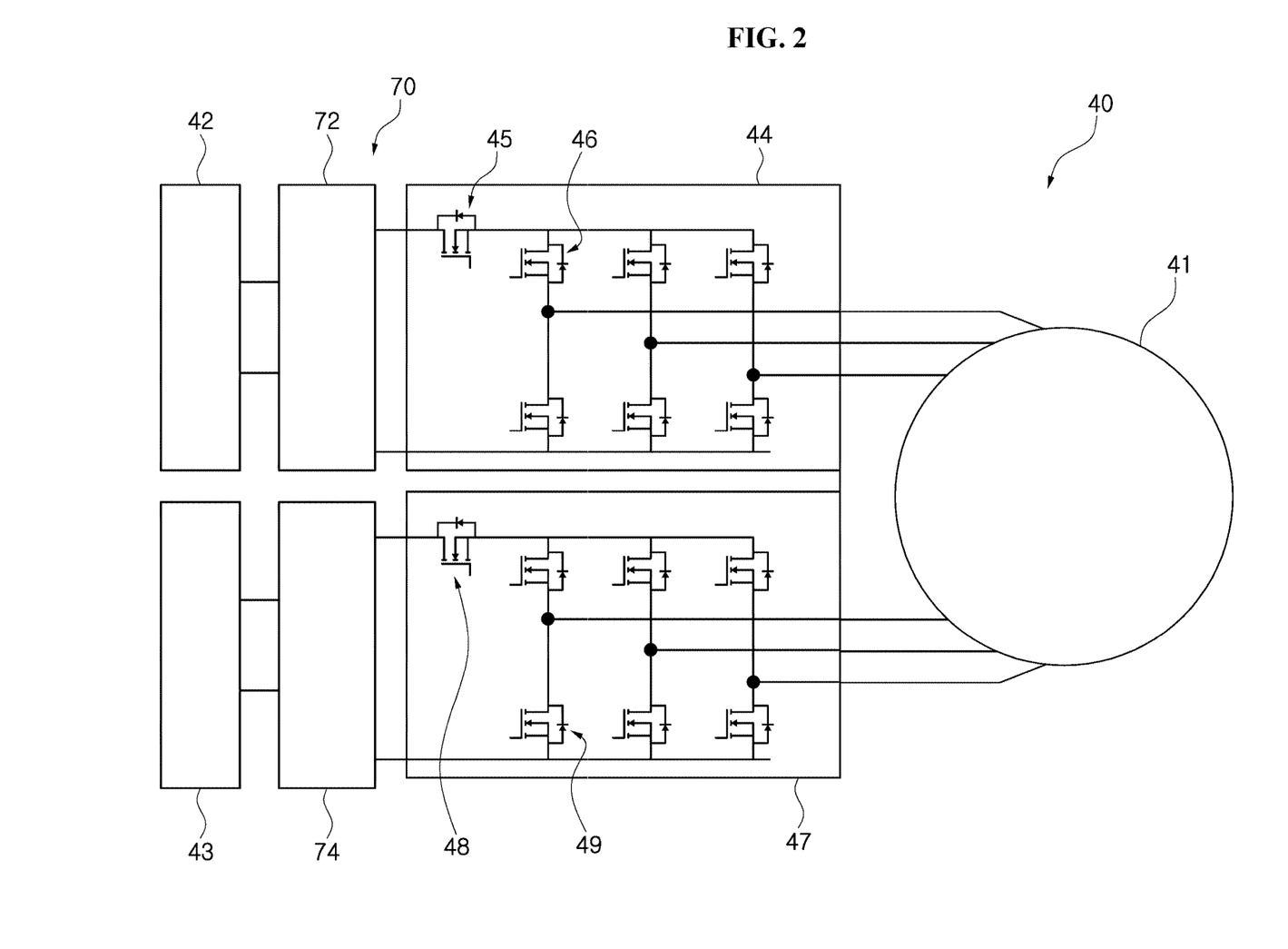
FIG. 2 is a diagram illustrating a connection state of a driving unit and a control unit in accordance with an embodiment of the present disclosure.

FIG. 1 is a diagram schematically illustrating a connection state of main configurations of a brake device for a vehicle in accordance with an embodiment of the present disclosure; FIG. 2 is a diagram illustrating a connection state of a driving unit and a control unit in accordance with an embodiment of the present disclosure; and FIG. 3 is a system circuit diagram of the brake device for a vehicle in accordance with an embodiment of the present disclosure.

Figure 3:
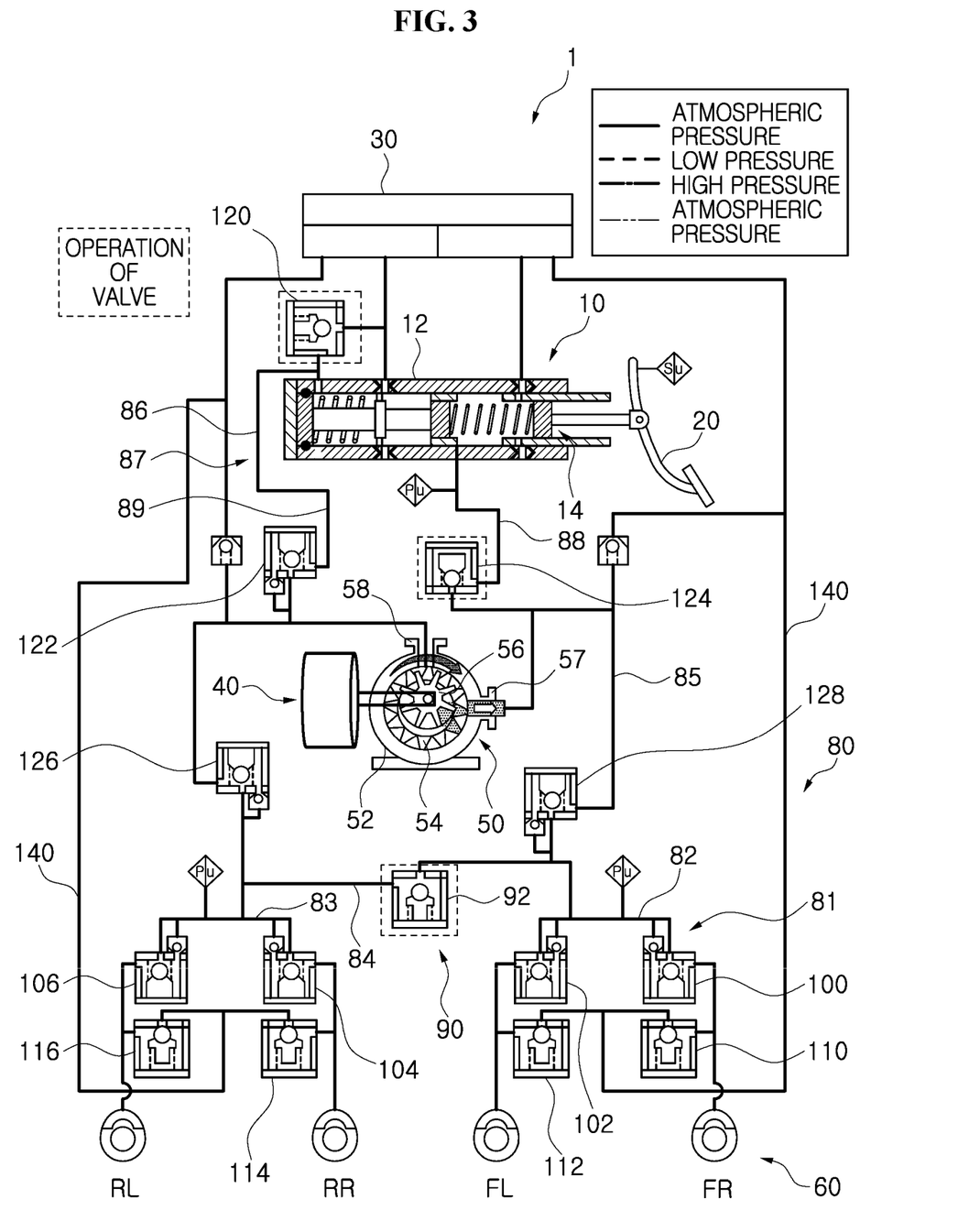
FIG. 3 is a system circuit diagram of the brake device for a vehicle in accordance with an embodiment of the present disclosure.

As illustrated in FIGS. 1 to 3, a brake device 1 for a vehicle in accordance with an embodiment of the present disclosure includes a master cylinder unit 10, a reservoir 30, a driving unit 40, a hydraulic generation unit 50, a wheel cylinder unit 60, and a control unit 70. The master cylinder unit 10 generates hydraulic pressure by the pressing of a pedal 20. The reservoir 30 is connected to the master cylinder unit 10 and stores oil. The driving unit 40 is operated by the movement of the pedal 20 and receives electric energy through a plurality of batteries to supply rotation power. The hydraulic generation unit 50 rotates by receiving the rotation power of the driving unit 40 and generates hydraulic pressure by the rotation of a plurality of rotors. The wheel cylinder unit 60 receives the hydraulic pressure generated by the hydraulic generation unit 50 and constrains the rotation of wheels. The control unit 70 detects whether the driving unit 40 normally operates and controls the operation of the driving unit 40 to supply the hydraulic generation unit 50 with the rotation power in an event of abnormal operation of the driving unit 40. Furthermore, the brake device 1 for a vehicle in accordance with an embodiment of the present disclosure further includes a fluid path valve unit 130 including a fluid path part 80 and a valve part 90.

The brake device 1 for a vehicle in accordance with an embodiment of the present disclosure is characterized by control of the driving unit 40 using a 3-phase two-set type motor, and it is of course that such a disclosure may also be applied to other types of electric boosters.

The pedal 20, to which an operating force of a driver is inputted, is rotatably installed, and internal pressure of the master cylinder unit 10 is variable by the rotation of the pedal 20.

The master cylinder unit 10 may be formed in various shapes within the technical scope of generating hydraulic pressure by the pressing of the pedal 20. In the master cylinder unit 10, as the pedal 20 of a brake is pressed, a cylinder unit 14 located inside a housing unit 12 is moved. Since such a master cylinder unit 10 is a publicly known configuration, a detailed description thereof will be omitted.

The reservoir 30 is connected to the master cylinder unit 10 and forms a space for storing oil.

The driving unit 40 is operated by the movement of the pedal 20 and receives electric energy through a plurality of batteries to supply rotation power. The driving unit 40 in accordance with an embodiment includes a 3-phase motor 41, a first battery 42, a second battery 43, a first inverter 44, and a second inverter 47.

The 3-phase motor 41, which generates the rotation power by the supply of electricity, uses a 3-phase alternating current, and the number of revolutions of the 3-phase motor 41 is determined according to the number of poles and a power frequency of the motor.

The first battery 42 supplies power to the 3-phase motor 41 and the second battery 43 supplies power to the 3-phase motor 41 together with the first battery 42.

The first inverter 44 converts the power of the first battery 42 into 3-phase power and supplies the 3-phase power to the 3-phase motor 41. The second inverter 47 converts the power of the second battery 43 into 3-phase power and supplies the 3-phase power to the 3-phase motor 41.

The first inverter 44 in accordance with an embodiment includes a first relay 45 that controls the supply of power of the first battery 42 and a plurality of first switches 46 that convert power passing through the first relay 45 into 3-phase power. In accordance with an embodiment, six first switches 46 are provided.

The second inverter 47 in accordance with an embodiment includes a second relay 48 that controls the supply of power of the second battery 43 and a plurality of second switches 49 that convert power passing through the second relay 48 into 3-phase power. In accordance with an embodiment, six second switches 49 are provided.

The control unit 70 may be variously deformed within the technical scope of detecting whether the driving unit 40 normally operates and controlling the operation of the driving unit 40 to supply the hydraulic generation unit 50 with the rotation power in an event of abnormal operation of the driving unit 40. The control unit 70 in accordance with an embodiment includes a first control part 72 installed between the first battery 42 and the first inverter 44, and a second control part 74 installed between the second battery 43 and the second inverter 47.

In accordance with an embodiment, when a failure of the second inverter 47 is detected, the control unit 70 outputs a switching open control signal to the second relay 48, and controls operations of the first relay 45 and the first switches 46 such that output of the first inverter 44 is doubled. Accordingly, the 3-phase motor 41 is operated by a current supplied to the 3-phase motor 41 through the first inverter 44. At this time, in order to prevent overheating of the first inverter 44, the control unit 70 controls and reduces the operation time of the first switches 46 to ¼.

Furthermore, when a failure of the second relay 48 is detected, the control unit 70 outputs a switching open control signal to the second switches 49, and controls operations of the first relay 45 and the first switches 46 such that output of the first inverter 44 is doubled. Accordingly, the 3-phase motor 41 is operated by a current supplied to the 3-phase motor 41 through the first inverter 44. At this time, in order to prevent overheating of the first inverter 44, the control unit 70 controls and reduces the operation time of the first switches 46 to ¼.

Furthermore, when a failure of the first inverter 44 is detected, the control unit 70 outputs a switching open control signal to the first relay 45, and controls operations of the second relay 48 and the second switches 49 such that output of the second inverter 47 is doubled. Accordingly, the 3-phase motor 41 is operated by a current supplied to the 3-phase motor 41 through the second inverter 47. At this time, in order to prevent overheating of the second inverter 47, the control unit 70 controls and reduces the operation time of the second switches 49 to ¼.

Furthermore, when a failure of the first relay 45 is detected, the control unit 70 outputs a switching open control signal to the first switches 46, and controls operations of the second relay 48 and the second switches 49 such that output of the second inverter 47 is doubled. Accordingly, the 3-phase motor 41 is operated by a current supplied to the 3-phase motor 41 through the second inverter 47. At this time, in order to prevent overheating of the second inverter 47, the control unit 70 controls and reduces the operation time of the second switches 49 to ¼.

The hydraulic generation unit 50 may use various types of pumps within the technical scope of rotating by receiving the rotation power of the driving unit 40 and generating hydraulic pressure by the rotation of a plurality of rotors. The hydraulic generation unit 50 in accordance with an embodiment includes a casing 52, a first rotor 54, a second rotor 56, a first connection pipe 57, and a second connection pipe 58.

The hydraulic generation unit 50 uses an internal rotation type gear pump, but may also use an external rotation type gear pump as needed. Inside the casing 52 that forms an external appearance, the first rotor 54 and the second rotor 56 are rotatably installed.

Furthermore, the first connection pipe 57 and the second connection pipe 58, which are passages for moving oil in another direction of the casing 52, are installed. When the first rotor 54 and the second rotor 56 are rotated in a forward direction (clockwise direction in FIG. 3), hydraulic pressure is discharged through the first connection pipe 57.

On the other hand, when the first rotor 54 and the second rotor 56 are rotated in a backward direction (counterclockwise direction in FIG. 3), hydraulic pressure is discharged through the second connection pipe 58.

The wheel cylinder unit 60 receives the hydraulic pressure generated by the hydraulic generation unit 50 and constrains the rotation of the wheels. Such a wheel cylinder unit 60 is mounted on each wheel of the vehicle and moves a brake pad by the hydraulic pressure, and the brake pad are in close contact with the wheel to constrain the rotation of the wheel.

The fluid path valve unit 130 includes the fluid path part 80 that transmits the hydraulic pressure generated by the hydraulic generation unit 50 to the wheel cylinder unit 60, and the valve part 90 that controls the flow of the hydraulic pressure.

The fluid path part 80 is a pipe that is connected to the master cylinder unit 10, the reservoir 30, the hydraulic generation unit 50, and the wheel cylinder unit 60 to transmit oil. The fluid path part 80 in accordance with an embodiment includes a first fluid path 81, a second fluid path 86, a transmission fluid path 87, and a return fluid path 140.

The first fluid path 81 forms a fluid path for transmitting hydraulic pressure for general braking generated by the hydraulic generation unit 50 to the wheel cylinder units 60 installed on the front wheels and the rear wheels. The first fluid path 81 in accordance with an embodiment includes a front fluid path 82 that supplies the hydraulic pressure to the wheel cylinder units 60 installed on the front wheels, a rear fluid path 83 that supplies the hydraulic pressure to the wheel cylinder units 60 installed on the rear wheels, a connection fluid path 84 that connects the front fluid path 82 and the rear fluid path 83, and a bridge fluid path 85 that connects the connection fluid path 84 and the hydraulic generation unit 50.

The second fluid path 86 forms a fluid path for transmitting hydraulic pressure for decompression, which is discharged from the hydraulic generation unit 50, to the reservoir 30.

Furthermore, the transmission fluid path 87 connects the master cylinder unit 10 and the first fluid path 81 and supplies the first fluid path 81 with hydraulic pressure for emergency braking generated by the master cylinder unit 10. The transmission fluid path 87 in accordance with an embodiment includes a first transmission fluid path 88 that connects the master cylinder unit 10 and the bridge fluid path 85 and a second transmission fluid path 89 that connects the master cylinder unit 10 and the second fluid path 86.

The return fluid path 140 connects the reservoir 30 and the wheel cylinder unit 60, and guides oil to be moved to the reservoir 30 when the wheel cylinder unit 60 is decompressed.

The valve part 90 may use various types of valves within the technical scope of being installed in the fluid path part 80 to control the flow of the oil. The valve part 90 in accordance with an embodiment uses a solenoid valve. The valve part 90 in accordance with an embodiment includes a connection control valve 92, a first inlet valve 100, a second inlet valve 102, a third inlet valve 104, a fourth inlet valve 106, a first discharge valve 110, a second discharge valve 112, a third discharge valve 114, a fourth discharge valve 116, a first valve 120, a second valve 122, a third valve 124, a fourth valve 126, and a fifth valve 128.

The connection control valve 92 is installed in the connection fluid path 84 to control the flow of the hydraulic pressure, and permits or blocks the movement of the hydraulic pressure between the front fluid path 82 and the rear fluid path 83. The connection control valve 92 in accordance with an embodiment is a normally closed valve.

The first inlet valve 100 is installed in the front fluid path 82 connected to the wheel cylinder unit 60 that brakes the front right wheel, and operates when the hydraulic pressure is supplied to the wheel cylinder unit 60 installed in the front right wheel. The first inlet valve 100 is a normally open valve.

The second inlet valve 102 is installed in the front fluid path 82 connected to the wheel cylinder unit 60 that brakes the front left wheel, and operates when the hydraulic pressure is supplied to the wheel cylinder unit 60 installed in the front left wheel. The second inlet valve 102 is a normally open valve.

The third inlet valve 104 is installed in the rear fluid path 83 connected to the wheel cylinder unit 60 that brakes the rear right wheel, and operates when the hydraulic pressure is supplied to the wheel cylinder unit 60 installed in the rear right wheel. The third inlet valve 104 is a normally open valve.

The fourth inlet valve 106 is installed in the rear fluid path 83 connected to the wheel cylinder unit 60 that brakes the rear left wheel, and operates when the hydraulic pressure is supplied to the wheel cylinder unit 60 installed in the rear left wheel. The fourth inlet valve 106 is a normally open valve.

The first discharge valve 110 is installed in the return fluid path 140 connected to the wheel cylinder unit 60 that brakes the front right wheel, and operates when the hydraulic pressure of the wheel cylinder unit 60 installed in the front right wheel is returned to the reservoir 30. The first discharge valve 110 is a normally closed valve.

The second discharge valve 112 is installed in the return fluid path 140 connected to the wheel cylinder unit 60 that brakes the front left wheel, and operates when the hydraulic pressure of the wheel cylinder unit 60 installed in the front left wheel is returned to the reservoir 30. The second discharge valve 112 is a normally closed valve.

The third discharge valve 114 is installed in the return fluid path 140 connected to the wheel cylinder unit 60 that brakes the rear right wheel, and operates when the hydraulic pressure of the wheel cylinder unit 60 installed in the rear right wheel is returned to the reservoir 30. The third discharge valve 114 is a normally closed valve.

The fourth discharge valve 116 is installed in the return fluid path 140 connected to the wheel cylinder unit 60 that brakes the rear left wheel, and operates when the hydraulic pressure of the wheel cylinder unit 60 installed in the rear left wheel is returned to the reservoir 30. The fourth discharge valve 116 is a normally closed valve.

The first valve 120 is installed in a fluid path, which connects the reservoir 30 and the master cylinder unit 10, to control the flow of the hydraulic pressure, and is a normally closed valve. The second valve 122 is installed in the second fluid path 86 to control the flow of the hydraulic pressure, and is a normally open valve. The third valve 124 is installed in the first transmission fluid path 88 to control the flow of the hydraulic pressure, and is a normally open valve. The fourth valve 126 is installed at a boundary between the first fluid path 81 and the second fluid path 86 to control the flow of the hydraulic pressure, and is a normally open valve. The fifth valve 128 is installed at a boundary between the bridge fluid path 85 and the connection fluid path 84 to control the flow of the hydraulic pressure, and is a normally open valve.

Hereinafter, operation states of the brake device 1 for a vehicle in accordance with an embodiment will be described in detail with reference to the accompanying drawings.

Figure 4:
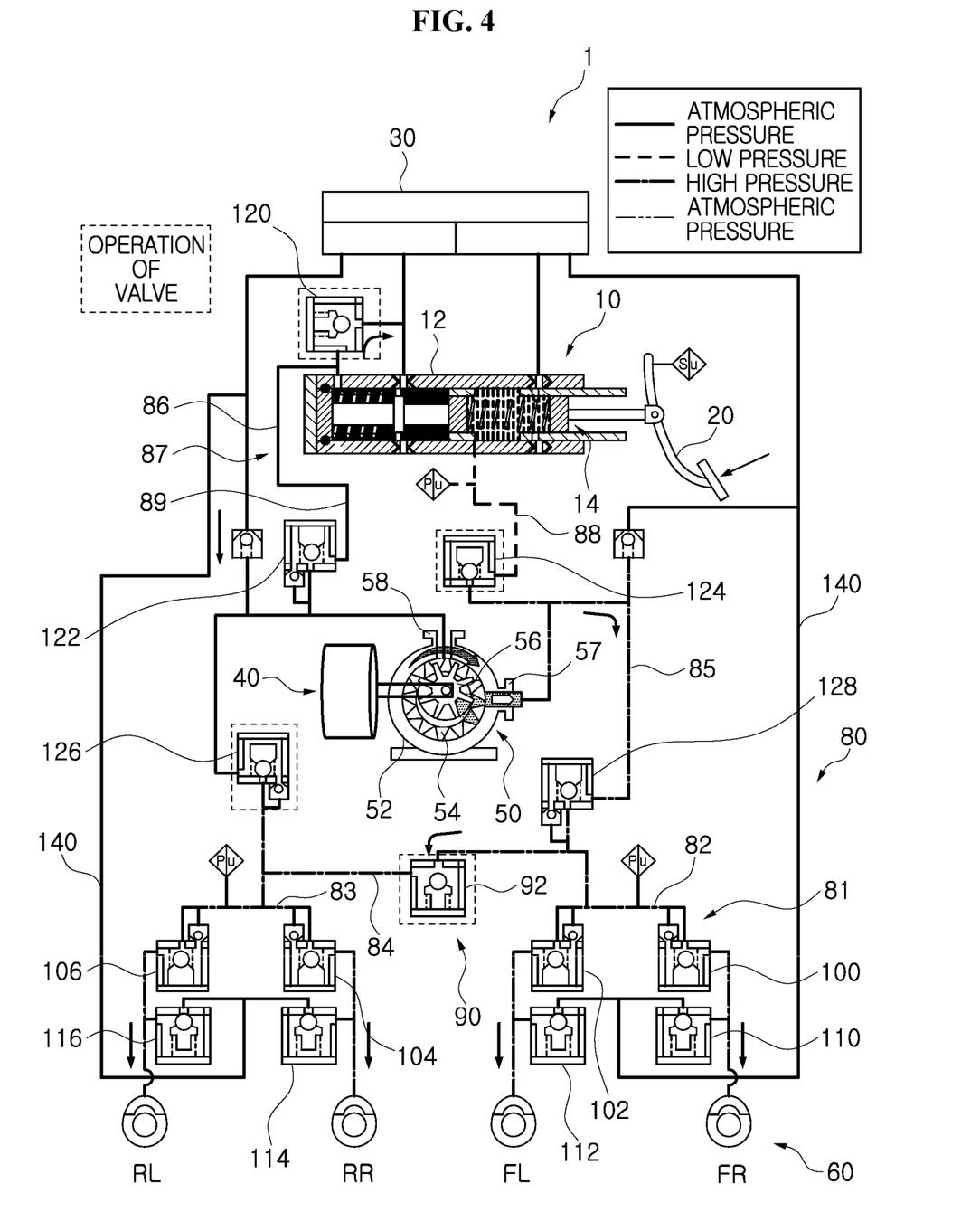
FIG. 4 is a diagram illustrating a state in which braking of wheel cylinder units is made by hydraulic pressure generated by a hydraulic generation unit in accordance with an embodiment of the present disclosure.

FIG. 4 is a diagram illustrating a state in which braking of the wheel cylinder units is made by hydraulic pressure generated by the hydraulic generation unit in accordance with an embodiment of the present disclosure.

As illustrated in FIG. 4, the first valve 120, the third valve 124, the fourth valve 126, and the connection control valve 92 are operated. Furthermore, since the first rotor 54 and the second rotor 56 of the hydraulic generation unit 50 are rotated in the forward direction, the hydraulic pressure discharged from the hydraulic generation unit 50 is supplied to the front fluid path 82 and the rear fluid path 83 through the bridge fluid path 85.

Accordingly, the wheel cylinder units 60 installed in the front fluid path 82 are operated to constrain the rotation of the wheels installed in the front of the vehicle, and the wheel cylinder units 60 installed in the rear fluid path 83 are operated to constrain the rotation of the wheels installed in the rear of the vehicle.

Figure 5:
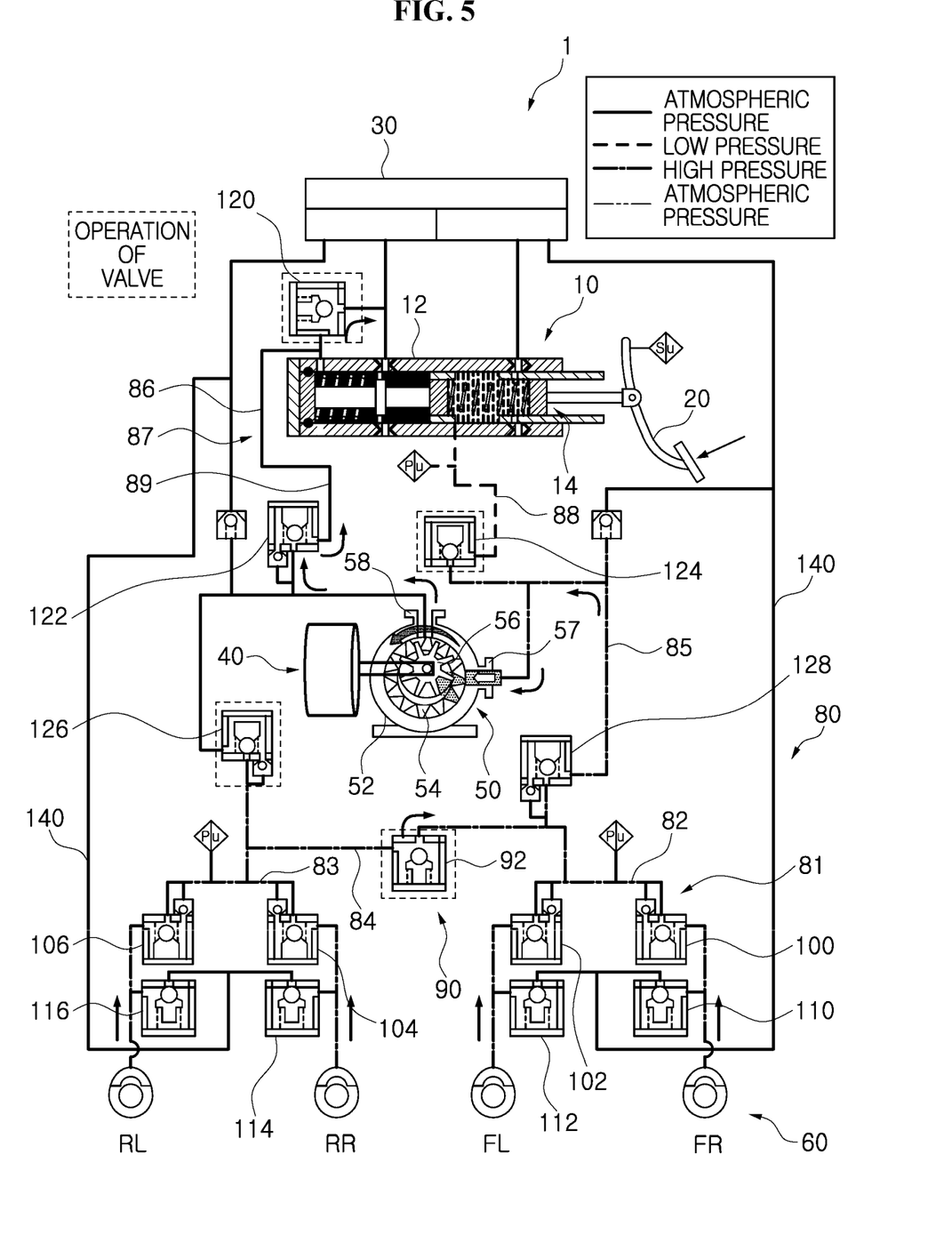
FIG. 5 is a diagram illustrating a state in which the wheel cylinder units are decompressed by reverse rotation of the hydraulic generation unit in accordance with an embodiment of the present disclosure.

FIG. 5 is a diagram illustrating a state in which the wheel cylinder units are decompressed by reverse rotation of the hydraulic generation unit in accordance with an embodiment of the present disclosure.

As illustrated in FIG. 5, in order to decompress the wheel cylinder units 60, the hydraulic generation unit 50 is driven in the backward direction. Then, the first valve 120, the third valve 124, the fourth valve 126, and the connection control valve 92 are operated.

Accordingly, hydraulic pressure discharged from the wheel cylinder units 60 installed in the front fluid path 82 and the wheel cylinder units 60 installed in the rear fluid path 83 is moved to the inside of the hydraulic generation unit 50, is moved along the second fluid path 86 through the second connection pipe 58, and then is stored in the reservoir 30.

Figure 6:
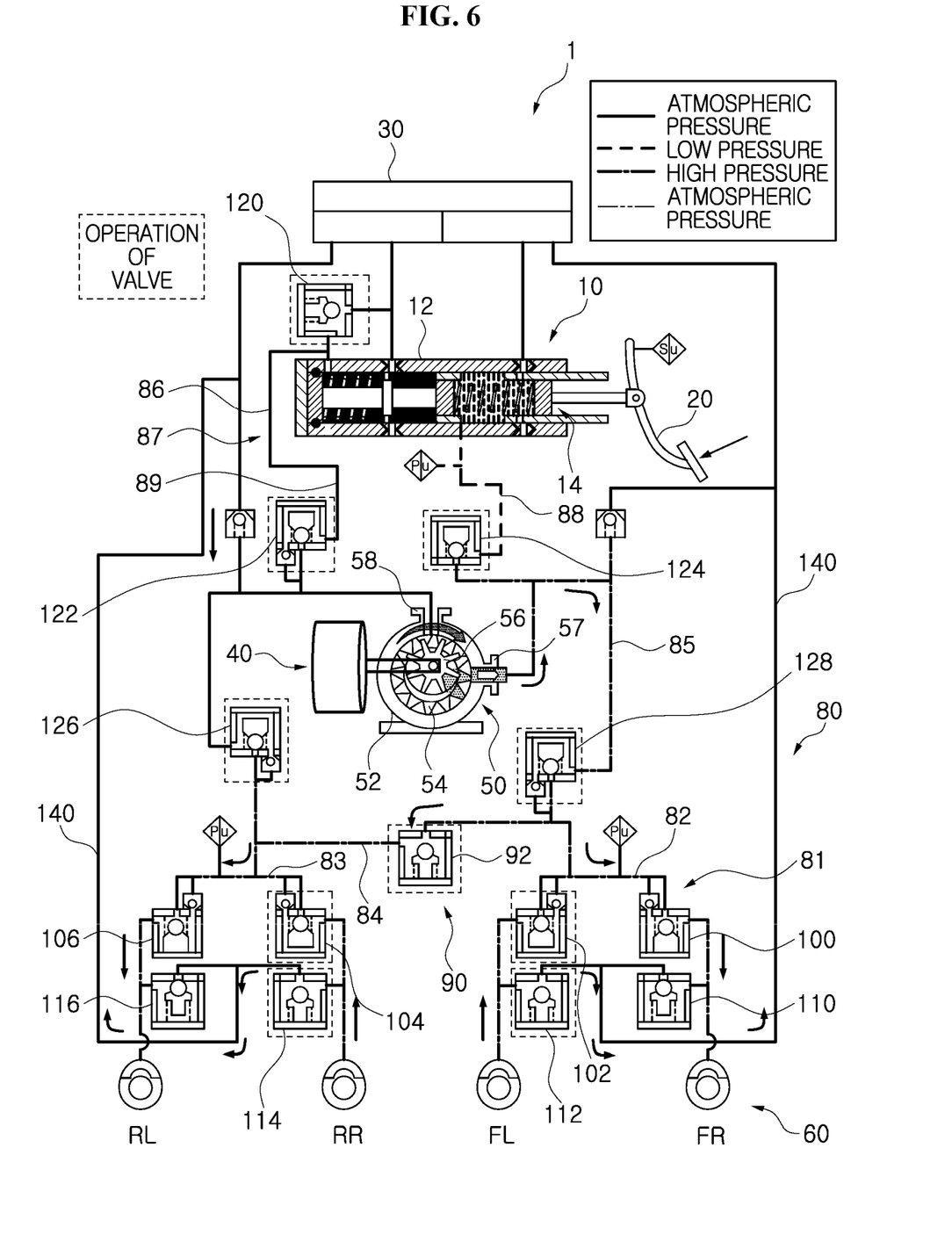
FIG. 6 is a diagram illustrating a state in which the wheel cylinder units are operated in an ABS mode in accordance with an embodiment of the present disclosure.

FIG. 6 is a diagram illustrating a state in which the wheel cylinder units are operated in an ABS mode in accordance with an embodiment of the present disclosure.

As illustrated in FIG. 6, when the brake device 1 for a vehicle is operated in the ABS mode, the first valve 120, the second valve 122, the third valve 124, the fourth valve 126, the fifth valve 128, the second inlet valve 102, the second discharge valve 112, the third inlet valve 104, and the third discharge valve 114 are operated.

Then, the hydraulic pressure of the wheel cylinder unit 60, which constrains the rotation of the front left wheel, is discharged through the second discharge valve 112, and is moved to the reservoir 30. Then, the hydraulic pressure of the wheel cylinder unit 60, which constrains the rotation of the rear right wheel, is discharged through the third discharge valve 114, and is moved to the reservoir 30.

The hydraulic pressure generated by the forward operation of the hydraulic generation unit 50 is moved through the first fluid path 81, is transmitted to the wheel cylinder unit 60, which constrains the rotation of the front right wheel, and the wheel cylinder unit 60, which constrains the rotation of the rear left wheel, and constrains the rotation of the front right wheel and the rear left wheel.

Figure 7:
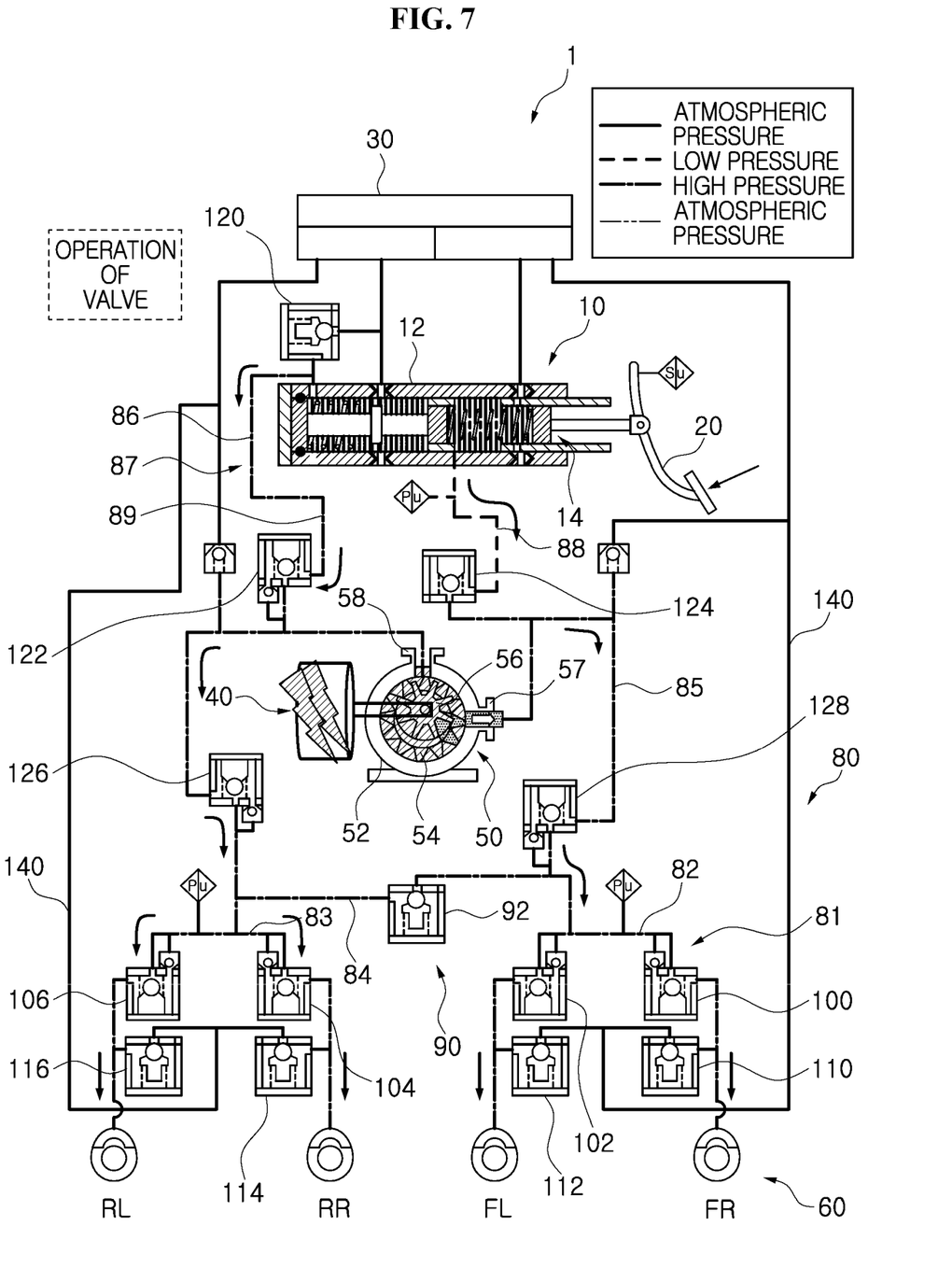
FIG. 7 is a diagram illustrating a state in which braking of the wheel cylinder units is made by hydraulic pressure generated by a master cylinder unit in accordance with an embodiment of the present disclosure.

FIG. 7 is a diagram illustrating a state in which braking of the wheel cylinder units is made by hydraulic pressure generated by the master cylinder unit in accordance with an embodiment of the present disclosure.

As illustrated in FIG. 7, when a failure occurs in the driving unit 40 or the hydraulic generation unit 50, hydraulic pressure of the master cylinder unit 10 generated when a driver steps on the pedal 20 is supplied to the first fluid path 81 through the transmission fluid path 87.

The hydraulic pressure is supplied to the bridge fluid path 85 of the first fluid path 81 through the first transmission fluid path 88 connected to one side of the master cylinder unit 10. The hydraulic pressure supplied to the bridge fluid path 85 is supplied only to the front fluid path 82 because the connection fluid path 84 has been blocked by the connection control valve 92, and is supplied to the wheel cylinder units 60 that constrain the rotation of the front wheels.

Furthermore, the hydraulic pressure moved through the second transmission fluid path 89 connected to the other side of the master cylinder unit 10 is moved to the rear fluid path 83 of the first fluid path 81 through the second fluid path 86. The hydraulic pressure supplied to the rear fluid path 83 is supplied to the wheel cylinder units 60 that constrain the rotation of the rear wheels. At this time, since no power is supplied to the valve part 90, the valve part 90 performs no operation.

Figure 8:
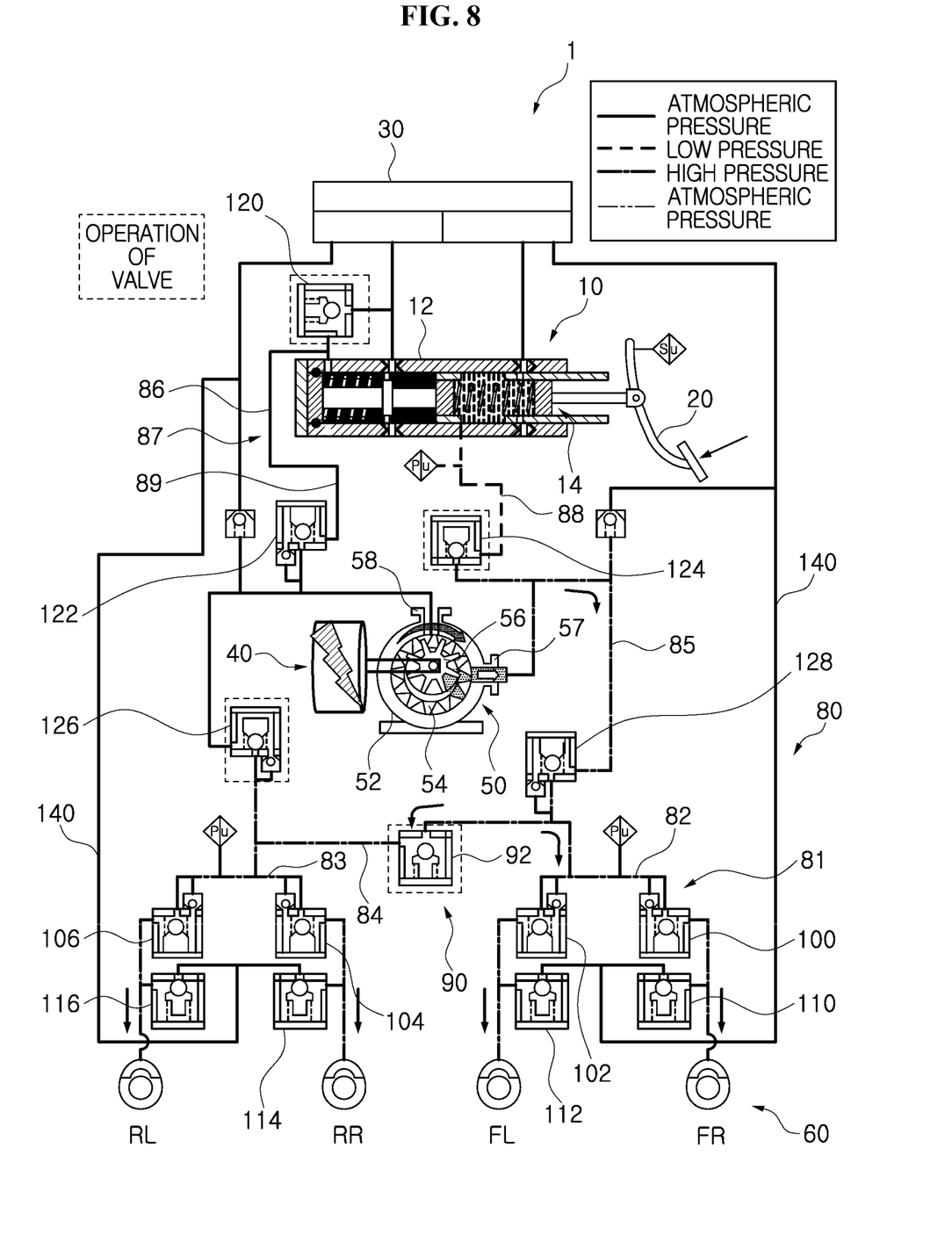
FIG. 8 is a diagram illustrating a state in which braking of the wheel cylinder units is made by an operation of the driving unit in an emergency operation mode in accordance with an embodiment of the present disclosure.

FIG. 8 is a diagram illustrating a state in which braking of the wheel cylinder units is made by an operation of the driving unit in an emergency operation mode in accordance with an embodiment of the present disclosure.

As illustrated in FIG. 8, when a failure occurs in a part of the driving unit 40, since the driving unit 40 operates in an emergency under the control of the control unit 70, the hydraulic generation unit 50 may normally operate. At this time, the brake device 1 for a vehicle operates in a boosting mode as illustrated in FIG. 4.

Figure 9:
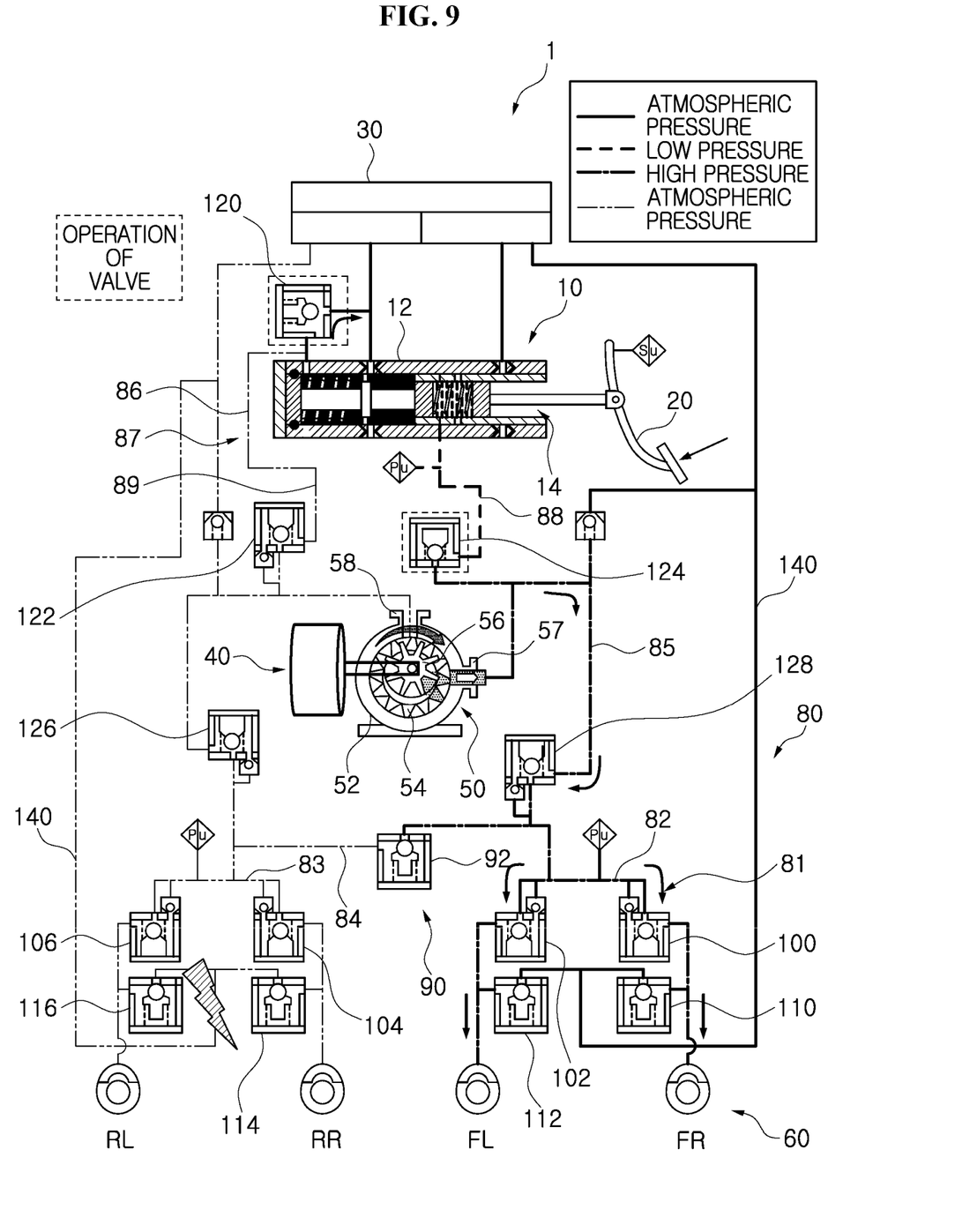
FIG. 9 is a diagram illustrating a state in which hydraulic pressure is supplied only to a front fluid path when a rear fluid path is abnormal in accordance with an embodiment of the present disclosure.

FIG. 9 is a diagram illustrating a state in which hydraulic pressure is supplied only to the front fluid path when the rear fluid path is abnormal in accordance with an embodiment of the present disclosure.

As illustrated in FIG. 9, when an abnormality occurs in the rear fluid path 83, the first valve 120 and the third valve 124 are operated. Furthermore, since the hydraulic generation unit 50 is operated in the forward direction (clockwise direction in FIG. 9), hydraulic pressure discharged through the first connection pipe 57 is supplied only to the front fluid path 82 through the bridge fluid path 85.

Accordingly, since the hydraulic pressure is supplied to the wheel cylinder units 60 connected to the front fluid path 82, the rotation of the front wheels may be constrained to allow the vehicle to brake.

Figure 10:
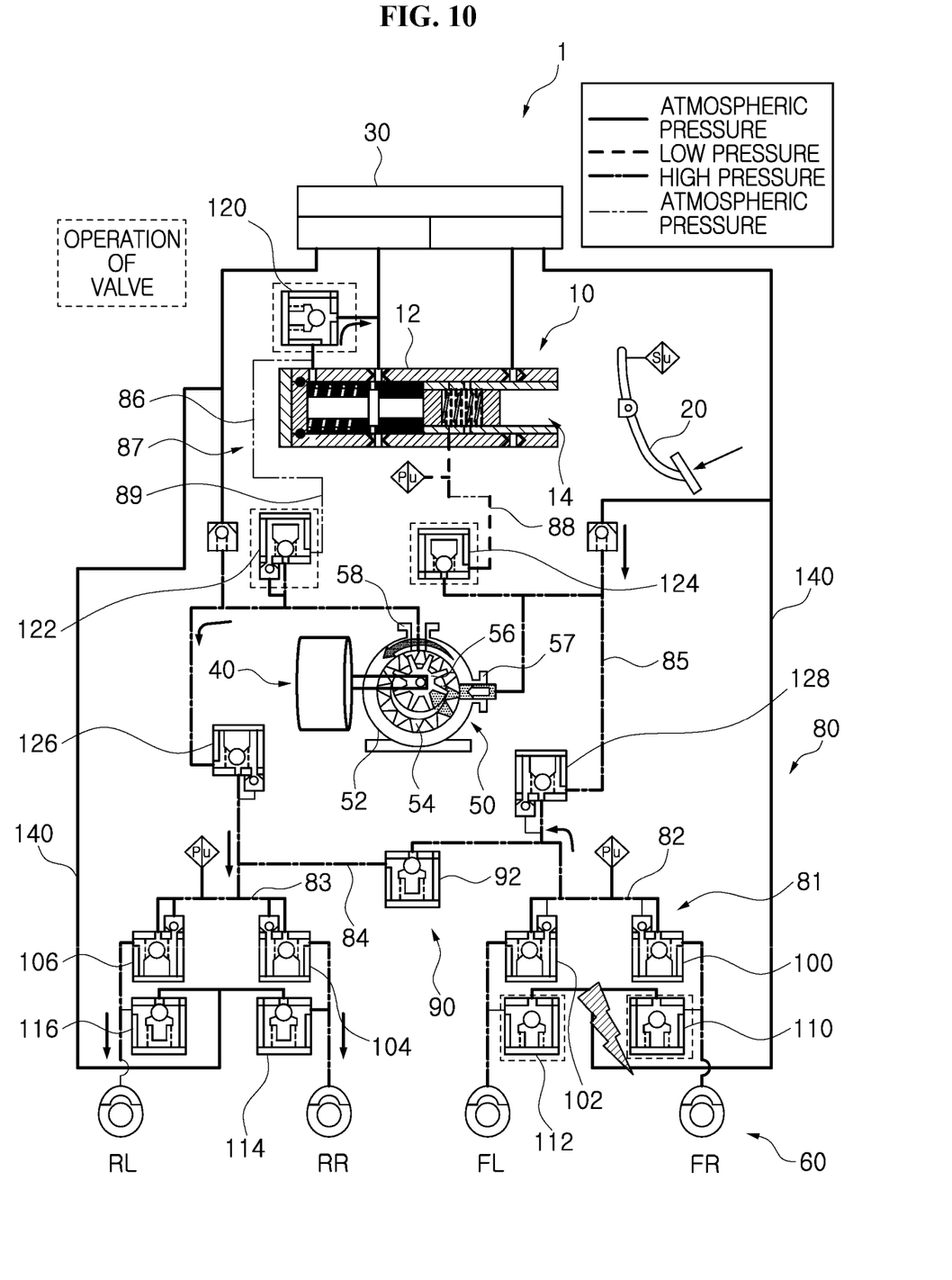
FIG. 10 is a diagram illustrating a state in which hydraulic pressure is supplied only to the rear fluid path when the front fluid path is abnormal in accordance with an embodiment of the present disclosure.

FIG. 10 is a diagram illustrating a state in which hydraulic pressure is supplied only to the rear fluid path when the front fluid path is abnormal in accordance with an embodiment of the present disclosure.

As illustrated in FIG. 10, when an abnormality occurs in the front fluid path 82, the first valve 120, the second valve 122, and the third valve 124 are operated. Furthermore, since the hydraulic generation unit 50 is operated in the backward direction (counterclockwise direction in FIG. 10), hydraulic pressure discharged through the second connection pipe 58 is supplied only to the rear fluid path 83 through the second fluid path 86.

Accordingly, since the hydraulic pressure is supplied to the wheel cylinder units 60 connected to the rear fluid path 83, the rotation of the rear wheels may be constrained to allow the vehicle to brake.

As described above, in accordance with an embodiment, since the hydraulic generation unit 50 is used as an electric booster, it is possible to simplify the system as compared with a cylinder-type electric booster, so that it is possible to increase the degree of freedom of design. Furthermore, when an error occurs in the driving unit 40, an emergency operation is easily performed under the control of the control unit 70, so that it is possible to improve the operation reliability of the device.

Although the present disclosure have been described with reference to the embodiments illustrated in the drawings, the embodiments of the disclosure are for illustrative purposes only, and those skilled in the art will appreciate that various modifications and equivalent other embodiments are possible. Thus, the true technical scope of the disclosure should be defined by the following claims.

What is claimed is:

1. A brake device for a vehicle, comprising:
a master cylinder unit configured to generate hydraulic pressure by pressing of a pedal;
a reservoir connected to the master cylinder unit and configured to store oil;
a driving unit operated by movement of the pedal and configured to receive electric energy through a plurality of batteries to supply rotation power;
a hydraulic generation unit configured to rotate by receiving the rotation power of the driving unit and generate hydraulic pressure by rotation of a plurality of rotors;
wheel cylinder units configured to receive the hydraulic pressure generated by the hydraulic generation unit and constrain rotation of wheels; and
a control unit configured to detect whether the driving unit normally operates and control an operation of the driving unit to supply the hydraulic generation unit with the rotation power in an event of abnormal operation of the driving unit,
wherein:
the driving unit comprises:
 a 3-phase motor configured to generate the rotation power by supply of electricity;
 a first battery configured to supply power to the 3-phase motor;
 a first inverter configured to convert the power of the first battery into 3-phase power and supply the 3-phase power to the 3-phase motor;
 a second battery configured to supply power to the 3-phase motor together with the first battery; and
 a second inverter configured to convert the power of the second battery into 3-phase power and supply the 3-phase power to the 3-phase motor;
the first inverter comprises:
 a first relay configured to control the supply of the power of the first battery; and
 a plurality of first switches configured to convert the power passing through the first relay into 3-phase power;
the second inverter comprises:
 a second relay configured to control the supply of the power of the second battery; and
 a plurality of second switches configured to convert the power passing through the second relay into 3-phase power;
in response to detection of a failure of the second inverter, the control unit outputs a switching open control signal to the second relay, controls operations of the first relay and the first switches such that output of the first inverter is doubled, and controls and reduces an amount of time the first switches are in operation to one quarter;
in response to detection of a failure of the second relay, the control unit outputs a switching open control signal to the second switches, controls operations of the first relay and the first switches such that output of the first inverter is doubled, and controls and reduces an amount of time the first switches are in operation to one quarter;
in response to detection of a failure of the first inverter, the control unit outputs a switching open control signal to the first relay, controls operations of the second relay and the second switches such that output of the second inverter is doubled, and controls and reduces an amount of time the first switches are in operation to one quarter; and
in response to detection of a failure of the first relay, the control unit outputs a switching open control signal to the first switches, controls operations of the second relay and the second switches such that output of the second inverter is doubled, and controls and reduces an amount of time the second switches are in operation to one quarter.

2. The brake device for a vehicle according to claim 1, further comprising:
a fluid path part connected to the master cylinder unit, the reservoir, the hydraulic generation unit, and the wheel cylinder units and configured to transmit oil; and
a valve part installed in the fluid path part and configured to control a flow of the oil.

3. The brake device for a vehicle according to claim 2, wherein the fluid path part comprises:
a first fluid path configured to transmit hydraulic pressure for general braking generated by the hydraulic generation unit to the wheel cylinder units installed on front wheels and rear wheels;
a second fluid path configured to transmit hydraulic pressure for decompression, which is discharged from the hydraulic generation unit, to the reservoir; and
a transmission fluid path configured to connect the master cylinder unit and the first fluid path and supply the first fluid path with hydraulic pressure for emergency braking generated by the master cylinder unit.

4. The brake device for a vehicle according to claim 3, wherein the first fluid path comprises:
a front fluid path configured to supply the hydraulic pressure to the wheel cylinder units installed on the front wheels;
a rear fluid path configured to supply the hydraulic pressure to the wheel cylinder units installed on the rear wheels;
a connection fluid path configured to connect the front fluid path and the rear fluid path; and
a bridge fluid path configured to connect the connection fluid path and the hydraulic generation unit.

5. The brake device for a vehicle according to claim 4, wherein the valve part comprises a connection control valve installed in the connection fluid path and configured to control a flow of the hydraulic pressure.

* * * * *